United States Patent
Lv et al.

(10) Patent No.: US 10,198,271 B2
(45) Date of Patent: Feb. 5, 2019

(54) SYSTEM AND METHOD FOR BOOTING APPLICATION SERVERS IN PARALLEL

(71) Applicant: Oracle International Corporation, Redwood Shores, CA (US)

(72) Inventors: Xianzheng Lv, Beijing (CN); Todd Little, Palatine, IL (US); Xiangdong Li, Beijing (CN); Jim Yongshun Jin, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 375 days.

(21) Appl. No.: 14/996,794

(22) Filed: Jan. 15, 2016

(65) Prior Publication Data

US 2017/0115995 A1    Apr. 27, 2017

Related U.S. Application Data (63) Continuation of application No. PCT/CN2015/092594, filed on Oct. 23, 2015.

(51) Int. Cl.
| | |
|---|---|
| *G06F 9/00* | (2006.01) |
| *G06F 15/177* | (2006.01) |
| *G06F 9/4401* | (2018.01) |
| *H04L 29/08* | (2006.01) |
| *G06F 21/57* | (2013.01) |

(52) U.S. Cl.
CPC .......... *G06F 9/4405* (2013.01); *G06F 15/177* (2013.01); *G06F 21/575* (2013.01); *H04L 67/1002* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 5,907,701 A | 5/1999 | Hanson | |
| 5,938,765 A * | 8/1999 | Dove | G06F 9/4401 713/1 |
| 6,960,595 B2 * | 11/2005 | Pinto | C07D 471/04 514/275 |
| 7,882,341 B2 * | 2/2011 | Rothman | G06F 9/4401 713/1 |

(Continued)

FOREIGN PATENT DOCUMENTS

| | | |
|---|---|---|
| CN | 1667573 A | 9/2005 |
| CN | 1776613 A | 5/2006 |

(Continued)

OTHER PUBLICATIONS

Translation of foreign patent CN 102486732.*

(Continued)

*Primary Examiner* — Nitin C Patel
(74) *Attorney, Agent, or Firm* — Tucker Ellis LLP (57) ABSTRACT

A system and method for booting application servers in parallel. In an exemplary method, each server and server group entry can be associated with a dependency attribute. The method can create a dependency map based upon the dependency attributes. Servers that do not have a dependency can be booted in parallel. The remaining servers and server groups can be booted based upon the dependency map.

20 Claims, 3 Drawing Sheets

(56) References Cited

U.S. PATENT DOCUMENTS

| | | | |
|---|---|---|---|
| 9,690,595 B2* | 6/2017 | Das | G06F 9/4405 |
| 2007/0198692 A1* | 8/2007 | Mimura | G06F 9/5038 |
| | | | 709/223 |
| 2012/0102072 A1* | 4/2012 | Jia | G06F 17/30197 |
| | | | 707/803 |
| 2015/0339129 A1* | 11/2015 | Divakaran | G06F 9/4405 |
| | | | 713/2 |
| 2016/0308729 A1* | 10/2016 | Choi | H04L 63/1408 |

FOREIGN PATENT DOCUMENTS

| | | |
|---|---|---|
| CN | 101251796 A | 8/2008 |
| CN | 102486732 A | 6/2012 |

OTHER PUBLICATIONS

International Search Report and Written Opinion issued by Chinese Patent Office for international patent application No. PCT/CN2015/092594, dated Jun. 22, 2016 (12 pages).

* cited by examiner

SYSTEM AND METHOD FOR BOOTING APPLICATION SERVERS IN PARALLEL

CLAIM OF PRIORITY

This application is a continuation of and claims priority to International Application titled "SYSTEM AND METHOD FOR BOOTING APPLICATION SERVERS IN PARALLEL", International Application No. PCT/CN2015/092594, filed Oct. 23, 2015, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to a transaction processing environment.

BACKGROUND

Traditional mechanisms for booting Tuxedo application (i.e., tmboot) usually boot Tuxedo application servers one by one in a defined order. For large/complex applications, this can lead to undesirably long boot times.

SUMMARY

A system and method for booting application servers in parallel. In an exemplary method, each server and server group entry can be associated with a dependency attribute. The method can create a dependency map based upon the dependency attributes. When called to do so, each server that has no dependency can be booted in parallel. The remaining servers and server groups can be booted based upon the dependency map.

Traditionally, Tuxedo has allowed application servers to be booted according to a sequence parameter. In such a situation, when an admin performs a tmboot (to boot servers for an application to utilized), the application servers can be booted according to an assigned sequence number/parameter. This may lead to slower server boot sequences.

The system and method disclosed herein add a DEPENDSON attribute for the GROUP and SERVER. The application servers can be booted in the order specified by the DEPENDSON parameter. This can allow for application servers to be booted in parallel, leading to quicker and more efficient boot processes.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

While specific implementations are discussed, it is understood that the specific implementations are provided for illustrative purposes only. A person skilled in the relevant art will recognize that other components and configurations may be used without departing from the scope and spirit of the invention.

The description of the invention as follows use the Tuxedo™ environment as an example for a transactional middleware machine environment. It will be apparent to those skilled in the art that other types of transactional middleware machine environments can be used without limitation.

Furthermore, in certain instances, numerous specific details can be set forth to provide a thorough description of the invention. However, it will be apparent to those skilled in the art that the invention may be practiced without these specific details. In other instances, well-known features have not been described in as much detail so as not to obscure the invention. In particular, the detailed description uses an XA distributed transaction environment as an example. It will be apparent to those skilled in the art that the present invention has application to other types of distributed transaction environment without limitation.

Common reference numerals are used to indicate like elements throughout the drawings and detailed description; therefore, reference numerals used in a figure may or may not be referenced in the detailed description specific to such figures if the element is described elsewhere.

Described herein are systems and methods for booting application servers in parallel in a transaction processing environment.

Transactional Middleware Environment

A transactional middleware system can comprise a combination of high performance hardware, e.g. 64-bit processor technology, high performance large memory, and redundant InfiniBand™ and Ethernet networking, together with an application server or middleware environment, such as WebLogic™ Suite, to provide a complete Java™ EE application server complex which includes a massively parallel in-memory grid, that can be provisioned quickly, and can scale on demand. The system can be deployed as a full, half, or quarter rack, or other configuration, that provides an application server grid, storage area network, and InfiniBand™ (IB) network. The middleware machine software can provide application server, middleware and other functionality such as, for example, WebLogic™ Server, JRockit™ or Hotspot JVM, Oracle™ Linux or Solaris, and Oracle™ VM. The system can include a plurality of compute nodes, IB switch gateway, and storage nodes or units, communicating with one another via an IB network. When implemented as a rack configuration, unused portions of the rack can be left empty or occupied by fillers.

For example, in systems such as "Sun Oracle Exalogic" or "Exalogic", the system is an easy-to-deploy solution for hosting middleware or application server software, such as the Oracle™ Middleware SW suite, or Weblogic. As described herein the transactional middleware system can be a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Oracle™ Real Application Clusters (RAC) Enterprise database, which is a clustered database with shared cache architecture and can be a component of a cloud architecture, and Exalogic Open storage. The system delivers improved performance with linear I/O scalability, is simple to use and manage, and delivers mission-critical availability and reliability.

In accordance with an embodiment of the invention, a transactional middleware system, such as a Tuxedo system, can take advantage of fast machines with multiple processors, such as an Exalogic middleware machine, and a high performance network connection, such as an Infiniband™ (IB) network.

An Oracle™ Tuxedo system provides a set of software modules that enables the construction, execution, and administration of high performance, distributed business applications and has been used as transactional middleware by a number of multi-tier application development tools. Tuxedo is a middleware platform that can be used to manage distributed transaction processing in distributed computing environments. It is a proven platform for unlocking enterprise legacy applications and extending them to a services oriented architecture, while delivering unlimited scalability and standards-based interoperability.

Furthermore, Tuxedo provides a service-oriented infrastructure for efficiently routing, dispatching, and managing requests, events, and application queues across system processes and application services. With virtually limitless scalability, it manages peak transaction volumes efficiently, improving business agility and letting IT organizations quickly react to changes in business demands and throughput. Oracle™ Tuxedo optimizes transactions across multiple databases and ensures data integrity across all participating resources, regardless of access protocol. The system tracks transaction participants and supervises an extended commit protocol, ensuring that all transaction commits and rollbacks are properly handled.

Additionally, the Oracle™ Tuxedo system can comply with the Open Group's X/Open™ standards, including the support of the XA standard for two-phase commit (2PC) processing, the X/Open™ ATMI API, the X/Open™ "Distributed Transaction Processing: The TX (Transaction Demarcation) Specification", and the X/Open™ Portability Guide (XPG) standards for language internationalization. The transactional application server can be referred to as an XA server, when it uses the XA standard. For example, each Tuxedo application server that belongs to a Tuxedo group can be configured using an OPENINFO property. All XA servers in a Tuxedo group can use the OPENINFO property to establish the connection to a resource manager (RM).

Tuxedo Application Server Sequential Boot

Traditionally, Tuxedo has allowed application servers to be booted according to a sequence parameter. In such a situation, when an admin performs a tmboot (to boot servers for an application to be utilized), the application servers would be booted according to an assigned sequence number/parameter.

Application servers can be booted in the order specified by a sequence parameter (e.g., SEQUENCE parameter), or in the order of server entries in a configuration file (e.g., UBBCONFIG). In a situation where two or more servers have a same SEQUENCE parameter, then tmboot may boot these servers in parallel, or may boot the servers in a sequence, and will not continue until they all complete initialization.

If a server cannot be started, a diagnostic can be written on a central event log, and tmboot can continue.

In such a situation where a server that failed to start and/or initialize is a prerequisite for other servers in the boot process to start, or when servers are failed to be confirmed, this can lead to undesired delay in the application server boot process.

Tuxedo Application Server Parallel Boot with Dependencies

Figure 1:
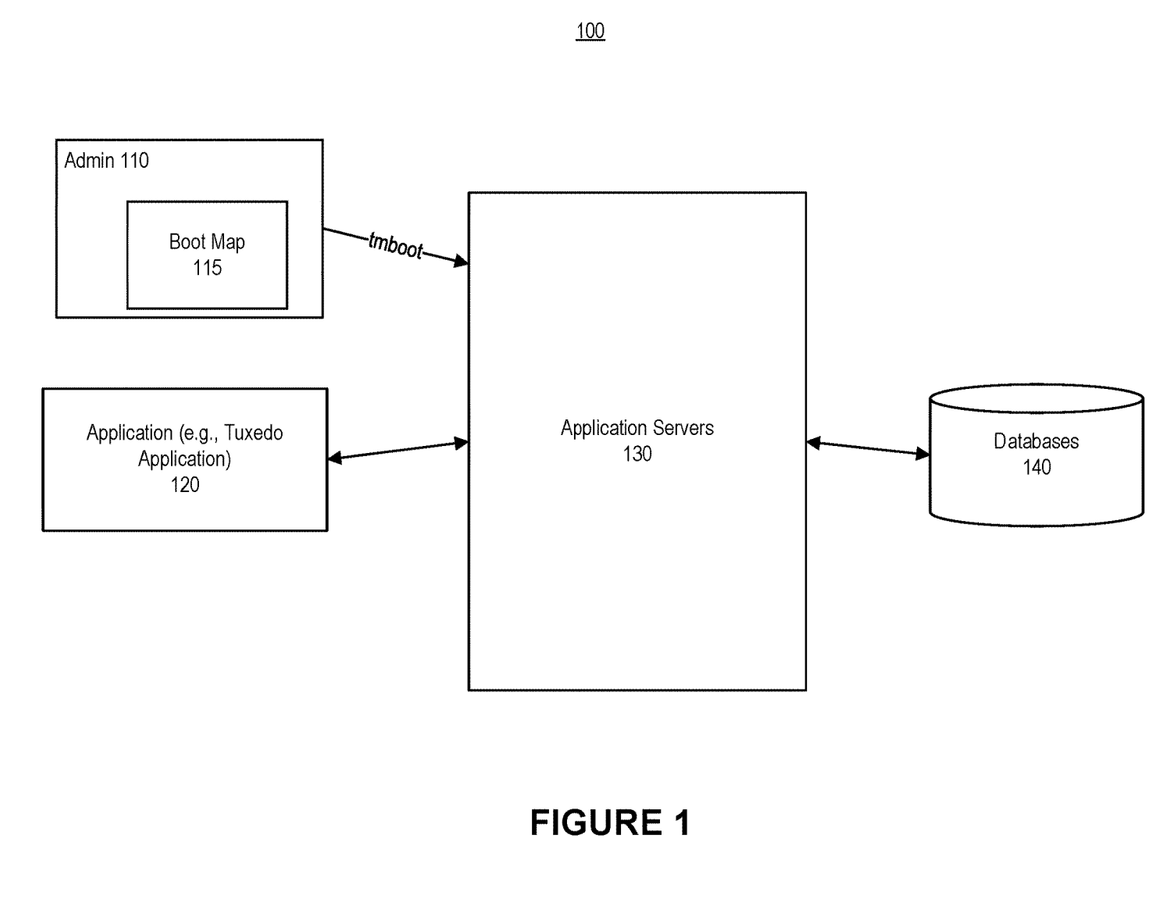
FIG. 1 shows an illustration of a transactional processing environment, in accordance with an embodiment.

FIG. 1 shows an illustration of a transactional processing environment 100. More specifically, FIG. 1 shows an illustration a parallel boot process for Tuxedo application servers in a transaction processing environment 100.

In accordance with an embodiment, within the transactional processing environment 100, an admin 110 can start one or a plurality of application servers 130, such as Tuxedo application servers, by using a command, such as tmboot, in conjunction with a boot map 115. Once booted and initialized, the application servers, which can be in communication with one or more databases 140, can be utilized by the application 120.

In accordance with an embodiment, the boot map 115 can comprise a boot plan that allows two or more of the application servers 130 to be booted in parallel, and can also account for dependencies between servers and server groups.

In accordance with an embodiment, an option to parallel boot Tuxedo application servers can be added to tmboot. This option can be a "-p num" option for tmboot to specify boot the application servers in parallel mode. As well, a new keyword, "DEPENDSON", can be added for groups and servers in UBBCONFIG to specify a boot order of the Tuxedo application servers when using the tmboot command.

In accordance with an embodiment, the "-p num" option for tmboot can specify to boot the application servers in parallel mode. The -p can mean boot the application servers in parallel. The 'num' means how many servers can start at the same time. For example, tmboot "-p 1" can be the same as tmboot without -p option. If num=0, the system can use a default number, such as 16.

In accordance with an embodiment, the methods and systems described herein can add a keyword DEPENDSON attribute for the GROUP and SERVER. The application servers can be booted in the order specified by the DEPENDSON parameter, or SEQUENCE parameter, or in the order of server entries in the configuration file (e.g., UBBCONFIG(5)). If both DEPENDSON and SEQUENCE parameters are specified, the DEPENDSON parameter has higher priority.

In accordance with an embodiment, the methods and systems described herein, can add option -p<number> for tmboot. The application servers without DEPENDSON relations which are configured in UBBCONFIG can boot in parallel. For example, in a situation where there are 20 servers without a dependency, and "-p 5" is specified, 5 applications servers can be booted in parallel at any given time.

In accordance with an embodiment, when operating in SHM (shared memory) mode, tmboot will start up all the servers which can boot in parallel and wait for the response of the started servers. The servers will send a response to tmboot process by a pipe and tmboot processes receive the response and do the later jobs.

In accordance with an embodiment, when operating in MP (multi-processor or multi-machine) mode, the tmboot and tlisten can create one more thread to interact with each other. The local thread can wait for the message sent from remote machine. If there any servers started remotely, notify the main thread to go on. The remote tlisten thread will prepare to collect the response from the started server. Once one server started or failed, tell the local thread via network message.

Figure 2:
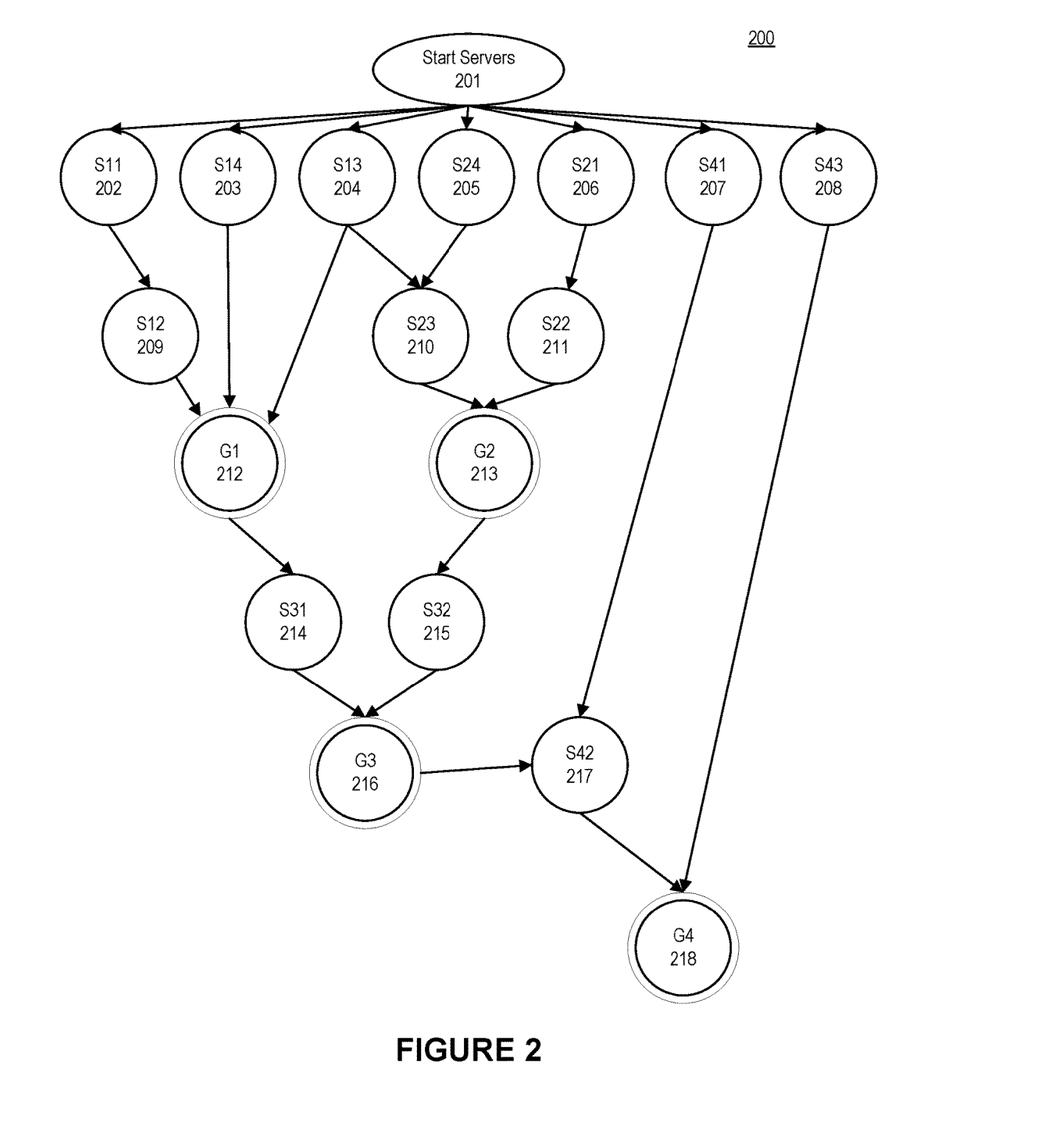
FIG. 2 shows an illustration of booting application servers in parallel, in accordance with an embodiment.

FIG. 2 shows an illustration of booting application servers in parallel, in accordance with an embodiment.

In accordance with an embodiment, FIG. 2 shows a dependency and parallel boot map 200 for a number of servers, e.g., servers S11 202, S12 209, S13 204, S14 203, S21 206, S22 211, S23 210, S24 205, S31 214, S32 215, S41 207, S42 217, and S43 208. In addition, the dependency and parallel boot map includes a number of server groups, including G1 212, G2 213, G3 216, and G4 218.

In accordance with an embodiment, the dependency and parallel boot map 200 of FIG. 2 can be built based upon the dependencies between the servers and groups.

In accordance with an embodiment, as shown in FIG. 2, there can be a number of server groups, i.e., 3 server groups, G1, G2, G3

G1 comprises servers S11, S12 (DEPENDSON S11), S13, and S14. The notation (DEPENDSON) can be used to indicate that S12 depends on S11 being booted and initialized to function properly.

G2 comprises servers S21, S22 (DEPENDSON S21), S23 (DEPENDSON G1.S13, S24), and S24. Again, the notation (DEPENDSON) can be used to indicate that S22 depends on S21 being booted and initialized to function properly. As well, S32 depends on S13 (of Group 1) and S24 being booted and initialized to function properly.

G3 (DEPENDSON G1, G2) can comprise servers S31 and S32. Again, here it is noted that in order for G3 to function properly, groups G1 and G2 must be fully booted and initialized.

G4 can comprise S41, S42 (DEPENDSON S41, G3), and S3. Again, the notation (DEPENDSON) can be used to indicate that G4 depends on S41 and G3 being booted and initialized to function properly.

Based upon the above dependencies, in accordance with an embodiment, the parallel boot map 200 of FIG. 2 can be constructed and started 201 such that the server boot order can be: S11, S13, S14, S21, S24, S41, S43 start in parallel. After S11 has started, then S12 can be started. After S21 has started, then S22 can be started. After S13 has started, S24 can be started, followed by starting S23. After the G1 (S11, S12, S13, S14) and G2(S21, S22, S23, S24) have been started, servers S31 and S32 can be started in parallel. After the G3(S31,S32) and S41 have started, S42 can be started. Once S42 and S43 have started, G4 is started and initialized.

In accordance with an embodiment, after all the servers have started, the tmboot task, as initiated by an admin, can be completed.

Figure 3:
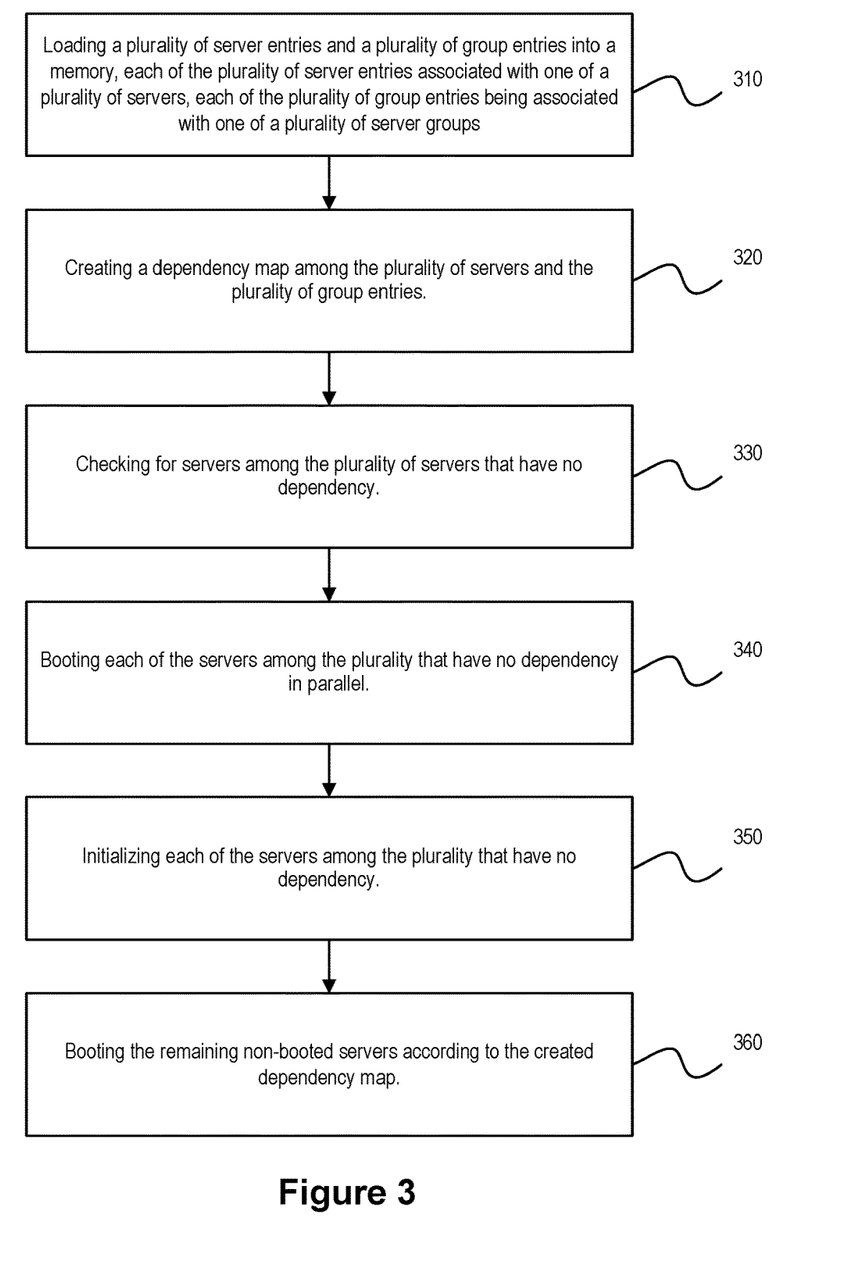
FIG. 3 shows a flow chart of an exemplary method for parallel booting of application servers in a transaction processing environment.

FIG. 3 shows a flow chart of an exemplary method for parallel booting of application servers in a transaction processing environment. The method can begin a step 310 with loading a plurality of server entries and a plurality of group entries into a memory, each of the plurality of server entries associated with one of a plurality of servers, each of the plurality of group entries being associated with one of a plurality of server groups. At step 320, the method can create a dependency map among the plurality of servers and the plurality of group entries. At step 330, the method can continue by checking for servers among the plurality of servers that have no dependency. At step 340, the method can boot each of the servers among the plurality that have no dependency in parallel. At step 350, the method can continue with initializing each of the servers among the plurality that have no dependency. At step 360, the method can boot the remaining non-booted servers according to the created dependency map.

In accordance with an embodiment, the steps depicted in FIG. 3 can be performed reclusively. For example, servers can be booted once the servers have no remaining unmet dependencies. Thus servers that have no dependencies can be immediately booted, and can be booted in parallel. As the dependencies of other servers in the dependency map are met (i.e., servers from which the server to be booted are already booted and initialized), those servers then become eligible to be booted. A level of parallelism can be controlled by the –p parameter to prevent trying to boot too many servers at once and causing problems with the operating system.

Boot Process

In accordance with an embodiment, when tmboot is run, an exemplary process can begin with loading the server and group entries from TUXCONFIG into memory. Next, the process can set the dependency between server and group nodes in the dependency map according to the DEPENDSON attributes of GROUP and SERVER. In accordance with an embodiment, the dependency map can be an acyclic map (i.e., a map that has no loops). Next, the process can check whether there is a loop or not and other DEPENDSON errors. Next, the process can add the servers to ready list from map_start node. Next the process can start the servers in ready list using asynchronous mode and prepare to get the response information from the pipe. If the process receives one response, check whether the dependent servers is ready to start, if ready add it to the ready list and go on to start the process in the ready list. Finally, if all the servers have started, tmboot can exit.

Create Dependency Map

In accordance with an embodiment, a process can create a dependency map, according to, for example, the below exemplary process:

---

Sort the servers/groups entries array according to the group name and server name.
For each entry of the servers/groups array
   Skip the same name servers according to the last entry.
     If it has dependson list
        Parse the dependson list
        For each dependson item in the dependson list
           Search the item in the servers/groups array
           Set the dependency between the server and dependson item
           If dependson item is group, set the server depends on all the server in the group
        End for
     End if
   Set the same name servers count and first same name server
End for
Read and set the dependency from configuration files
For each entry of the servers/groups array
   If the entry is server, set the server's group dependson all the servers in its group
End for
For each entry of the servers/groups array
   If the server dependson nothing, set it dependson map_start
   If the server dependsby nothing, set it dependsby map_end
End for
Check the dependency loop Parallel Boot in Local Mode In accordance with an embodiment, a procedure can support parallel boot in local mode. The below is an example of such a procedure:

```
tmboot with -p
    create the dependency map
    create ready list
    process proc response
    For each server will start
        Check the server dependent server start or not, if not show warning
        Start the process (call sync_proc to start the process in local or remote machine do not wait response )
            addWaitRspList
            processProcRsp
    End for
Unix:
tmboot process create anonymous pipe, fork the server processes, send the pipe fd to the server processes.
The server processes complete the tpsrvinit, then send response to tmboot via pipe.
The tmboot will read the pipe with NON-BLOCK mode, once get any response, check the dependency map to decide the next server to boot.
Windows
tmboot process create named pipe, fork the server processes. The server processes open and connect to the named pipe, after complete the tpsrvinit, then send response to tmboot via named pipe.
The tmboot create one thread and wait the pipe information. If get any response, check the dependency map to decide the next server to boot.
```

SHM Mode

In accordance with an embodiment, parallel boot can be supported in SHM mode. In SHM mode, tmboot can start up all the servers in ready-set and wait for the response from the started server. The servers can send a response to tmboot process by pipe and tmboot processes receive the response and do the later jobs. Tmboot starts the servers in ready-set using asynchronous mode and prepares to collect the response from the started server. If a server receives one response, check whether the depended servers is ready to start, if ready add it to the ready-set list and start it.

Parallel Boot in MP Mode

In accordance with an embodiment, parallel boot can be supported in MP mode. In MP mode, the tmboot and tlisten can create one more threads to interact with each other. The local thread can wait for the message sent from remote machine. If there any server started at remote, notify the main thread to go on. The remote tlisten thread will prepare to collect the response from the started server. Once one server has started or failed, tell the local thread via network message.

Many features of the present invention can be performed in, using, or with the assistance of hardware, software, firmware, or combinations thereof. Consequently, features of the present invention may be implemented using a processing system (e.g., including one or more processors).

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs). Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for booting application servers in parallel in a transaction processing environment, comprising:
    loading a plurality of server entries and a plurality of group entries into a memory, each of the plurality of server entries associated with one of a plurality of servers, each of the plurality of group entries being associated with one of a plurality of server groups respectively comprising two or more of the plurality of servers, wherein the respective servers in the plurality of servers comprises an application server in a transactional middleware system;
creating a dependency map among the plurality of servers and the plurality of group entries;
checking for servers among the plurality of servers that have no dependency;
booting each of the servers among the plurality of servers that have no dependency in parallel, wherein:
while operating the transaction processing environment in a shared memory (SHM) mode, a boot process module starts up respective servers among the plurality of servers that have no dependency in parallel, and the respective servers among the plurality of servers that have no dependency send a response to the boot process module; and
while operating the transaction processing environment in a multi-processor (MR) mode, the boot process module and a network-independent listener process create a local thread to interact with each other, and the local thread can receive a message sent from remote servers started remotely and notify a main thread;
initializing each of the servers among the plurality of servers that have no dependency; and
booting the remaining non-booted servers according to the created dependency map.

2. The method of claim 1, wherein creating the dependency map comprises:
checking each of the plurality of server entries and the plurality of group entries for a dependency attribute; and
creating the dependency map based on each dependency attribute found during the check.

3. The method of claim 2, further comprising:
checking the dependency map for dependency loops; and
when a dependency loop is found, re-creating the dependency map to avoid the found dependency loop.

4. The method of claim 3, further comprising:
checking that of each of the servers among the plurality of servers that have no dependency booted in parallel are running properly before booting the remaining non-booted servers according to the created dependency map.

5. The method of claim 1, wherein the server entries comprise a dependency attribute to another server in the transaction processing environment, and the group entries comprise a dependency attribute to at least one another server in the transaction processing environment.

6. The method of claim 5, wherein the transaction processing environment operates in shared memory (SHM) mode.

7. The method of claim 5, wherein the transaction processing environment operates in multi-processor (MP) mode.

8. A system for booting application servers in parallel in a transaction processing environment, the system comprising:
one or more microprocessors; and
a processor, running on the one or more microprocessors, wherein the processor operates to perform steps comprising:
loading a plurality of server entries and a plurality of group entries into a memory, each of the plurality of server entries associated with one of a plurality of servers, each of the plurality of group entries being associated with one of a plurality of server groups respectively comprising two or more of the plurality of servers, wherein the respective servers in the plurality of servers comprises an application server in a transactional middleware system;
creating a dependency map among the plurality of servers and the plurality of group entries;
checking for servers among the plurality of servers that have no dependency;
booting each of the servers among the plurality of servers that have no dependency in parallel, wherein:
while operating the transaction processing environment in a shared memory (SHM) mode, a boot process module starts up respective servers among the plurality of servers that have no dependency in parallel, and the respective servers among the plurality of servers that have no dependency send a response to the boot process module; and
while operating the transaction processing environment in a multi-processor (MR) mode, the boot process module and a network-independent listener process create a local thread to interact with each other, and the local thread can receive a message sent from remote servers started remotely and notify a main thread;
initializing each of the servers among the plurality of servers that have no dependency; and
booting the remaining non-booted servers according to the created dependency map.

9. The system of claim 8, wherein creating the dependency map comprises:
checking each of the plurality of server entries and the plurality of group entries for a dependency attribute; and
creating the dependency map based on each dependency attribute found during the check.

10. The system of claim 9, the steps further comprising:
checking the dependency map for dependency loops; and
when a dependency loop is found, re-creating the dependency map to avoid the found dependency loop.

11. The system of claim 10, the steps further comprising:
checking that of each of the servers among the plurality of servers that have no dependency booted in parallel are running properly before booting the remaining non-booted servers according to the created dependency map.

12. The system of claim 8, wherein the server entries comprise a dependency attribute to another server in the transaction processing environment, and the group entries comprise a dependency attribute to at least one another server in the transaction processing environment.

13. The system of claim 12, wherein the transaction processing environment operates in shared memory (SHM) mode.

14. The system of claim 12, wherein the transaction processing environment operates in multi-processor (MP) mode.

15. A non-transitory machine readable storage medium having instructions stored thereon for booting application servers in parallel in a transaction processing environment that when executed cause a system to perform steps comprising:
loading a plurality of server entries and a plurality of group entries into a memory, each of the plurality of server entries associated with one of a plurality of servers, each of the plurality of group entries being associated with one of a plurality of server groups respectively comprising two or more of the plurality of servers, wherein the respective servers in the plurality of servers comprises an application server in a transactional middleware system;
creating a dependency map among the plurality of servers and the plurality of group entries;
checking for servers among the plurality of servers that have no dependency;
booting each of the servers among the plurality of servers that have no dependency in parallel, wherein:
 while operating the transaction processing environment in a shared memory (SHM) mode, a boot process module starts up respective servers among the plurality of servers that have no dependency in parallel, and the respective servers among the plurality of servers that have no dependency send a response to the boot process module; and
 while operating the transaction processing environment in a multi-processor (MR) mode, the boot process module and a network-independent listener process create a local thread to interact with each other, and the local thread can receive a message sent from remote servers started remotely and notify a main thread;
initializing each of the servers among the plurality of servers that have no dependency; and
booting the remaining non-booted servers according to the created dependency map.

16. The non-transitory machine readable storage medium of claim 15, wherein creating the dependency map comprises:
 checking each of the plurality of server entries and the plurality of group entries for a dependency attribute; and
 creating the dependency map based on each dependency attribute found during the check.

17. The non-transitory machine readable storage medium of claim 16, the steps further comprising:
 checking the dependency map for dependency loops; and
 when a dependency loop is found, re-creating the dependency map to avoid the found dependency loop.

18. The non-transitory machine readable storage medium of claim 17, the steps further comprising:
 checking that of each of the servers among the plurality of servers that have no dependency booted in parallel are running properly before booting the remaining non-booted servers according to the created dependency map.

19. The non-transitory machine readable storage medium of claim 15, wherein the server entries comprise a dependency attribute to another server in the transaction processing environment, and the group entries comprise a dependency attribute to at least one another server in the transaction processing environment.

20. The non-transitory machine readable storage medium of claim 19, wherein the transaction processing environment operates in one of shared memory (SHM) mode or multi-processor (MP) mode.

* * * * *